(12) United States Patent
Woodworth et al.

(10) Patent No.: US 12,445,469 B2
(45) Date of Patent: Oct. 14, 2025

(54) USING A THREAT INTELLIGENCE FRAMEWORK TO POPULATE A RECURSIVE DNS SERVER CACHE

(71) Applicant: Level 3 Communications, LLC, Broomfield, CO (US)

(72) Inventors: John R.B. Woodworth, Amissville, VA (US); Dean Ballew, Sterling, VA (US); Dan Luther, Claremore, OK (US); Mark Dehus, Thornton, CO (US)

(73) Assignee: Level 3 Communications, LLC, Denver, CO (US)

( * ) Notice: Subject to any disclaimer, the term of this patent is extended or adjusted under 35 U.S.C. 154(b) by 347 days.

(21) Appl. No.: 17/822,582

(22) Filed: Aug. 26, 2022

(65) Prior Publication Data
US 2023/0069845 A1 Mar. 9, 2023

Related U.S. Application Data

(60) Provisional application No. 63/241,420, filed on Sep. 7, 2021.

(51) Int. Cl.
| | |
|---|---|
| *H04L 9/40* | (2022.01) |
| *G06F 16/953* | (2019.01) |
| *H04L 61/4511* | (2022.01) |
| *H04L 61/58* | (2022.01) |

(52) U.S. Cl.
CPC ........ *H04L 63/1425* (2013.01); *G06F 16/953* (2019.01); *H04L 61/4511* (2022.05); *H04L 61/58* (2022.05)

(58) Field of Classification Search
CPC . H04L 61/4511; H04L 61/58; H04L 63/1458; H04L 63/1416; H04L 63/1466; H04L 63/0236; H04L 63/0227; H04L 63/1425; H04L 63/1408; H04L 63/14; G06F 21/50; G06F 21/00; G06F 21/577
See application file for complete search history.

(56) References Cited

U.S. PATENT DOCUMENTS

| | | | |
|---|---|---|---|
| 10,033,692 B1 * | 7/2018 | Vavrusa | H04L 61/59 |
| 2015/0180892 A1 * | 6/2015 | Balderas | H04L 61/4511 726/22 |
| 2018/0375716 A1 * | 12/2018 | Huque | H04L 61/4511 |
| 2019/0280948 A1 * | 9/2019 | Abley | H04L 12/46 |
| 2021/0092595 A1 * | 3/2021 | Ramachandran | H04W 12/037 |

* cited by examiner

*Primary Examiner* — William R Korzuch
*Assistant Examiner* — Sayeda Salma Nahar

(57) ABSTRACT

The present application describes systems and methods for populating a DNS cache of a recursive DNS server using information gathered by a threat intelligence system. The threat intelligence system may collect some or all DNS responses from one or more recursive DNS servers as the one or more DNS servers process various received requests. Since the threat intelligence engine has access to this DNS data, the DNS data may be used to seed a DNS cache of a recursive DNS server.

18 Claims, 6 Drawing Sheets

USING A THREAT INTELLIGENCE FRAMEWORK TO POPULATE A RECURSIVE DNS SERVER CACHE

CROSS-REFERENCE TO RELATED APPLICATIONS

This application claims benefit of U.S. Provisional Application No. 63/241,420 filed 7 Sep. 2021, entitled "Using a Threat Intelligence Framework to Populated a Recursive DNS Server Cache," which is incorporated herein by reference in its entirety.

BACKGROUND

The Domain Name System (DNS) is used to convert a domain name to an internet protocol (IP) address thereby allowing a browser of a computing device to access resources and information provided by a webpage associated with the domain name. For example, when a request for the domain name is received by a DNS server, the DNS server finds the IP address associated with the domain name and returns it to the requesting computing device.

In some examples, the DNS server may be a recursive DNS server. When the query is received, the recursive DNS server communicates with other DNS servers to determine the IP address associated with the query. When the answer is found, the answer is cached. Caching the answer allows subsequent queries to be resolved more quickly as the recursive DNS server does not need to communicate with other DNS servers so long as the cached information is still valid.

While the cache may be helpful is resolving queries, populating a cache for a DNS server that has restarted and/or is new is a time-consuming and resource-consuming process.

SUMMARY

The present application describes systems and methods for populating a domain name system (DNS) cache of a recursive DNS server. In an example, the data that is used to populate the DNS cache is received from a threat intelligence system associated with a network of which the recursive DNS server is a part. The threat intelligence system may passively and/or actively capture DNS data associated with communications between various client devices and various recursive DNS servers via the network. For example, the threat intelligence system may collect some or all DNS queries and/or responses to/from one or more recursive DNS servers as the one or more recursive DNS servers process various queries. Since the threat intelligence engine has access to this DNS data, the DNS data may be used to seed a DNS cache of a recursive DNS server.

Accordingly, aspects of the present disclosure describe a method for populating a DNS cache of a recursive DNS server. In some examples, the method includes receiving a trigger notification. The trigger notification indicates that a DNS cache of a recursive DNS server needs to be populated in response to the occurrence of an event. Based on receiving the trigger notification, the DNS cache and/or the recursive DNS server is provided access to a threat intelligence system. The threat intelligence system stores query-answer pairs associated with previously received queries. The DNS cache of the recursive DNS server is then populated with the query-answer pairs.

In another example of populating a DNS cache, a method comprises detecting a trigger event associated with a DNS server. In response to detecting the trigger event, a determination is made as to whether the recursive DNS server has access to a cache of query-answer pairs. When it is determined that the recursive DNS server does not have access to the cache of query-answer pairs, the recursive DNS server is provided access to query-answer pairs collected by a threat intelligence system. A DNS cache of the recursive DNS server is then populated with the query-answer pairs stored by the threat intelligence system.

The present application also describes a system comprising a processor and a memory. The memory is coupled to the processor and stores instructions that, when executed by the processor, perform operations. In an example, these operations include detecting a trigger event associated with a recursive DNS server. In response to detecting the trigger event, a determination is made as to whether a recursive DNS server has access to a cache of query-answer pairs. When it is determined that the recursive DNS server does not have access to the cache of query-answer pairs, a geographic location associated with the recursive DNS server is determined. A collection of query-answer pairs collected by a threat intelligence system is filtered based, at least in part, on the geographic location associated with the recursive DNS server. The DNS cache of the recursive DNS server is then populated with the filtered query-answer pairs.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
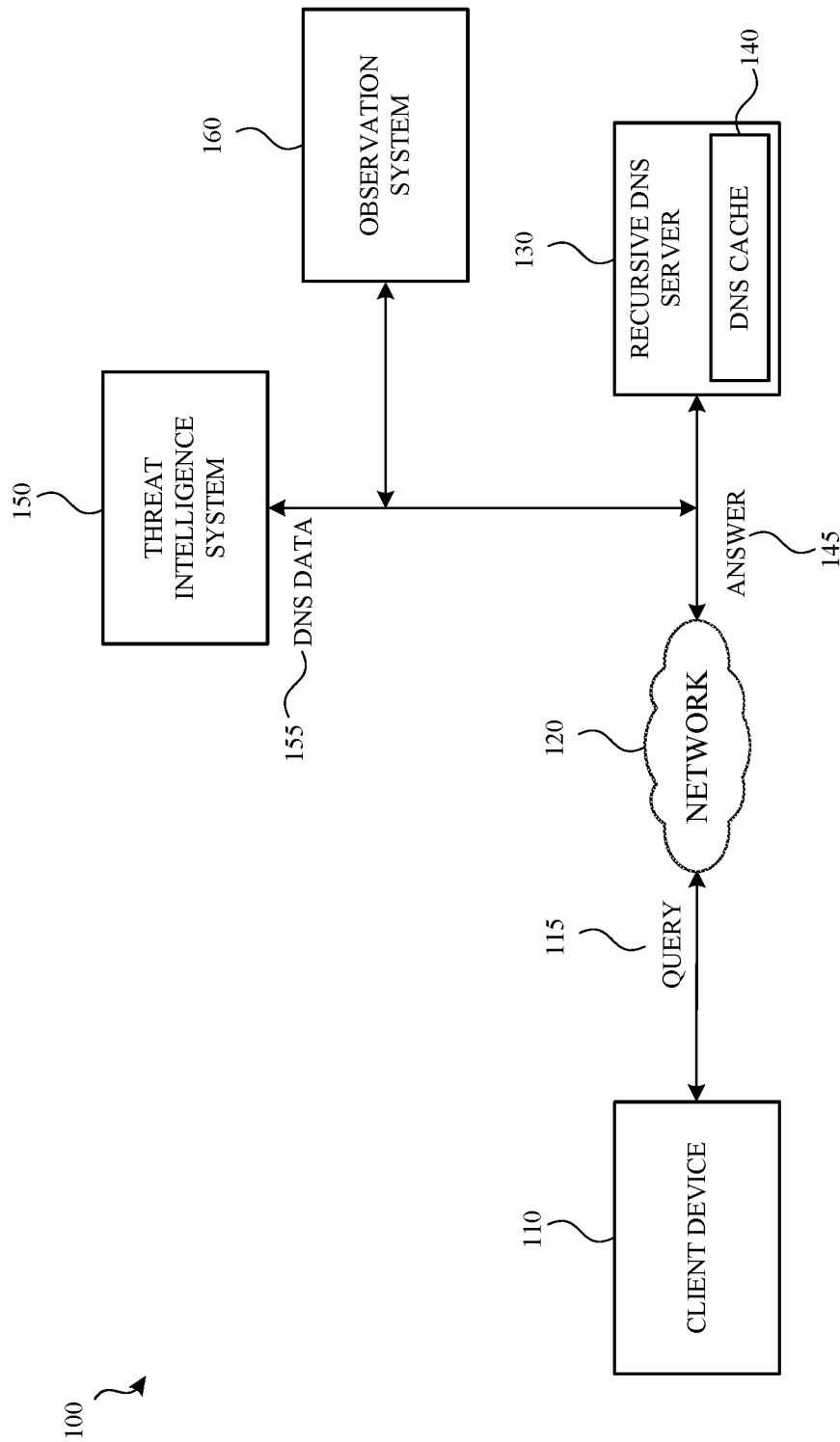
FIG. 1A illustrates an example system in which a threat intelligence system captures DNS data according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Each website on the Internet is hosted by a server and is identified using an Internet protocol (IP) address. However, instead of requiring an individual to input a particular IP address into a browser to access a particular website, the individual may simply input a domain name (e.g., www.example.com) into a browser application executing on her computing device to access the particular website.

When the individual inputs the domain name into the browser, the browser connects to a recursive DNS server associated with or otherwise provided by a network provider. The recursive DNS server may have stored the IP address associated with the domain name in a cache. In such an example, the recursive DNS server provides the cached IP address back to the requesting computing device and the computing device accesses the requested domain.

Because the recursive DNS server caches an answer to every query it receives (at least for an amount of time, known as a time-to-live), the recursive DNS server is able to quickly provide a cached answer to received queries without communicating with other DNS servers. In some examples, a recursive DNS server may run a 95%-98% hit rate. That is, when a query is received, typically there is a 95%-98% chance that the answer to the query is stored in the DNS cache of that particular recursive DNS server.

However, when a recursive DNS server crashes and is subsequently restarted, or when a new recursive DNS server is initialized (e.g., when a new recursive DNS server begins to service a new geographic area), the DNS cache is typically empty. Filling the DNS cache of the recursive DNS server may be a time-consuming process, and performance of the recursive DNS server may be severely impacted.

For example, when a cache of the recursive DNS server is populated, the recursive DNS server may be able to service more than 125,000 queries per second. However, when the cache is being populated upon initialization, this number may drop significantly. For example, when the recursive DNS server is initialized, the recursive DNS server may only be able to service 8,000 queries per second.

In an effort to combat the performance hit described above when a recursive DNS server is initialized and/or restarted, the present application describes a method and system for populating a DNS cache of a recursive DNS server. In some examples, when the recursive DNS server is initialized, the recursive DNS server determines whether it has access to a local cache or some other backup cache. For example, in operation a recursive DNS server may back up its cache so that, if it fails and/or restarts, the DNS server cache can be repopulated from its own backup cache. If not, however, the recursive DNS server may access DNS data stored by a threat intelligence system associated with a network. The threat intelligence system may passively and/or actively capture DNS data associated with communications between various client devices on the network and various recursive DNS servers associated with the network.

The threat intelligence system may analyze various requests, communications, and/or DNS data in order to determine whether the information contained in the requests, communications and/or DNS data could be used in or could otherwise indicate a potential attack. Some of the threats include Denial-of-service (DoS) attack, a distributed denial-of-service (DDoS) attack and so on. In an example, the threat intelligence system may determine, based on the information contained in the DNS data where a particular request originated from and compare that with a list of known or suspected threats.

Since the threat intelligent system collects all of this information, the threat intelligence system has access to most, if not all, query-answer pairs exchanged between the client devices and the recursive DNS servers. Since the threat intelligence engine has access to the query-answer pairs, this information may be used to seed a DNS cache of a recursive DNS server.

In an example, various filters may be applied to the DNS data stored by the threat intelligence system. The filters may be based on a geographic area associated with the recursive DNS server, a time-to-live of the query-answer pair, or a popularity of the query. Although specific filters are mentioned, other filters may be used.

These and other examples will be described in more detail with respect to the figures below.

FIG. 1A illustrates an example system 100 in which DNS data 155 captured by a threat intelligence system 150 may be used to populate a DNS cache 140 of a recursive DNS server 130. The threat intelligence system 150 is shown in FIG. 1A (and FIG. 1B-FIG. 1C) as receiving data in parallel with the recursive DNS server 130 and operates passively to collect DNS data 155 without actively filtering out any queries 115 before they reach recursive DNS server 130. In other examples, the threat intelligence system 150 may be situated in the data flow path between client device 110 and recursive server 130 such that queries 115 are received from client device 110 and evaluated by threat intelligence system 150 before being passed to recursive DNS server 130.

For example and as shown in FIG. 1A, a client device 110 may submit a query 115 to a recursive DNS server 130 via a network 120. The client device 110 may be any type of computing device including, but not limited to, a mobile phone, desktop computer, laptop computer, gaming device, tablet and so on.

The query 115 may be a request for a particular website such as, for example, www.example.com. When the query 115 is received by the recursive DNS server 130, the recursive DNS server 130 determines whether the query 115 can be resolved with information that is stored in the DNS cache 140 associated with the recursive DNS server 130.

If the request 115 can be resolved with information in the DNS cache 140, and if the recursive DNS server 130 determines that information (e.g., an IP address) contained in an answer 145 to the query 115 is valid (e.g., the time-to-live of the answer 145 has not expired), the recursive DNS server 130 provides the answer 145, including the IP address associated with www.example.com, back to the client device 110. The client device 110 may then access the requested webpage—www.example.com.

In an example, the answer 145 may include the query 115. As such, the threat intelligence system 150 may capture and/or store the query-answer pair (shown as DNS data 155) prior to or when the answer 145 is provided to the client device 110. In another example, the threat intelligence system 150 captures the query 115 as the query 115 is being provided to the recursive DNS server 130 and subsequently captures the corresponding answer 145 prior to or as the answer is provided back to the client device 110.

The system 100 also includes an observation system 160. The observation system 160 may be used to monitor the status of the recursive DNS server 130 and provide instructions to the threat intelligence system 150 when it is determined that the DNS cache 140 of the recursive DNS server 130 should be populated with the DNS data 155. In an example, the observation system 160 may be part of the threat intelligence system 150. In another example, the observation system 160 may be part of the recursive DNS server 130. In yet another example, the observation system 160 may be provided by a network service provider.

Figure 1B:
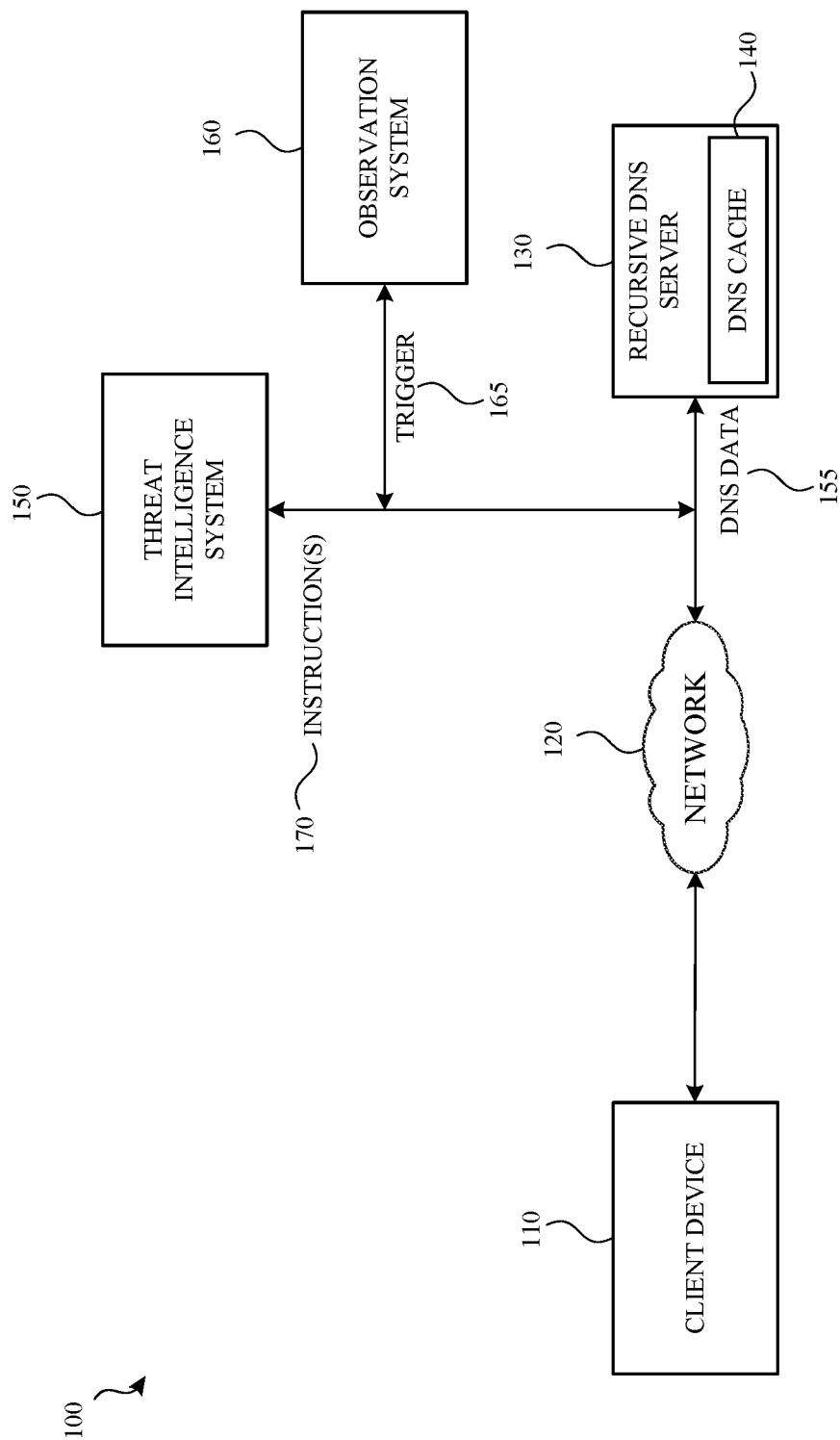
FIG. 1B illustrates the example system of FIG. 1A in which an observation system detects an event associated with a recursive DNS server according to an example.
Figure 1C:
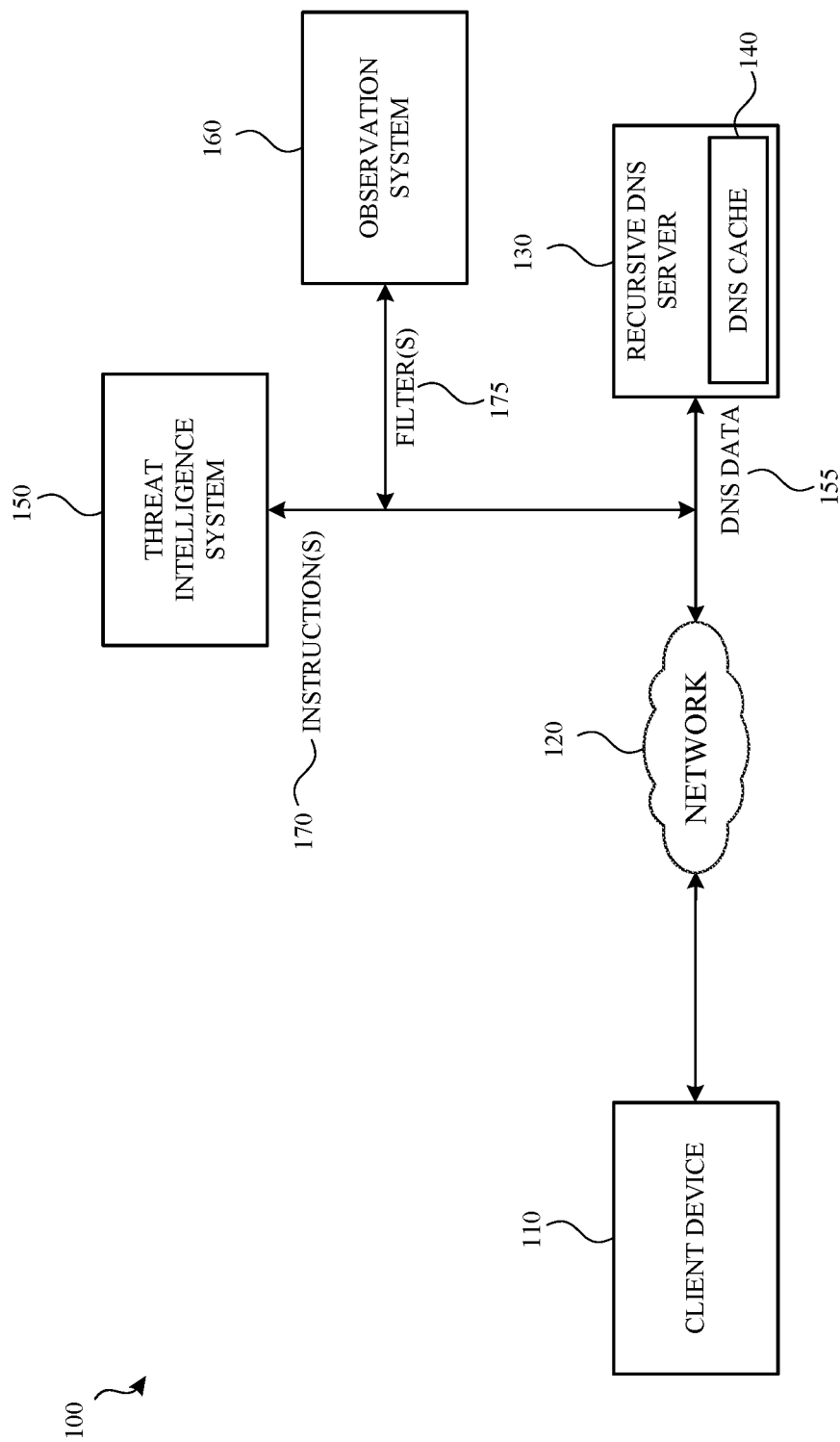
FIG. 1C illustrates the example system of FIG. 1A in which DNS data captured by the threat intelligence system is provided to the recursive DNS server according to an example.

As shown in FIG. 1B, the observation system 160 may receive or otherwise detect a trigger 165 from, or otherwise associated with, the recursive DNS server 130. The trigger 165 may be provided to the observation system 160 and/or detected by the observation system 160 in response to an event. The event may be an event associated with the recursive DNS server 130.

In one example, the event may be one in which the recursive DNS server 130 has crashed or has otherwise failed and is subsequently rebooting/restarting. As a result of the failure, the DNS cache 140 of the recursive DNS server 130 may need to be populated with DNS data 155 collected by the threat intelligence system 150. In another example, the event may be an instantiation event in which the recursive DNS server 130 is initialized or otherwise set up to service a particular geographic area or region.

In another example, the recursive DNS server 130 may be a virtual recursive DNS server and the event may be an instantiation of the virtual recursive DNS server. In yet another example, the event may be one in which the recursive DNS server 130 determines that it does not have access to a local cache or other backup cache with which to populate its own DNS cache 140.

In some examples, the trigger 165 may be based on a response provided by the recursive DNS server 130 and detected by the observation system 160. The trigger 165 may be based on monitored performance metrics associated with the recursive DNS server 130. For example, the trigger 165 may be detected if the recursive DNS sever 130 denies or forwards a particular number of queries 115 to one or more other recursive DNS servers in specified amount of time (e.g., the recursive DNS server has denied or forwarded 100 requests in the last 10 seconds). Although specific examples have been given, other events are contemplated.

When the trigger 165 is received or otherwise detected by the observation system 160, the observation system 160 sends instructions 170 to the threat intelligence system 150. The instructions 170 cause the threat intelligence system 150 to provide stored DNS data 155 to the recursive DNS server 130. Although an observation system 160 is shown and described, it is contemplated that the recursive DNS server 130 may be configured to provide the instructions 170 directly to the threat intelligence system 150 in response to detecting a trigger event such as those described above. In such an example, the threat intelligence system 150 may provide the DNS data 155 directly to the recursive DNS server 130.

Once the recursive DNS server 130 receives the DNS data 155, the DNS data 155 may be stored in the DNS cache 140. Since the threat intelligence system 150 continuously, and in real-time or near real-time, receives DNS data 155, the recursive DNS server 130 typically has the most accurate and up to date DNS data 155 when it populates its DNS cache 140 with the DNS data 155. In some examples, receipt of the DNS data 155 enables the recursive DNS server 130 to process requests at a higher rate when compared with a process that requires the recursive DNS server to query other recursive DNS servers in order to fill its cache.

For example, using the DNS data from the threat intelligence system 150 allows the recursive DNS server 130 to populate its DNS cache 140 almost immediately after coming online. Thus, the performance hit (e.g., the recursive DNS server 130 only being able to process approximately 8,000 queries per second versus the approximately 125,000 queries per second when the DNS cache 140 is populated) of the recursive DNS server 130 coming online is substantially decreased and/or eliminated.

In an example, the DNS data 155 may be subjected to one or more filters 175 prior to being provided to the recursive DNS server 130. For example and referring to FIG. 1C, the one or more filters 175 may be applied to the DNS data 155 by the observation system 160. The one or more filters 175 may limit or otherwise reduce the amount of DNS data 155 that is provided to the recursive DNS server 130. Accordingly, the amount of superfluous data provided to and/or stored by the DNS cache 140 may be substantially reduced or eliminated.

For example, the observation system 160 may provide filtering instructions to the threat intelligence system 150. The threat intelligence system 150 may then apply the filters before responding to the request for DNS data 155. In another example, the DNS data 155 may be sent to the observation system 160 from the threat intelligence system 150 in an unfiltered state. The observation system 160 may then apply the various filters to the DNS data 155 and send the filtered DNS data to the recursive DNS server 130. In another example, recursive DNS server 130 may receive unfiltered DNS data 155 and the filters 175 and perform the filtering.

In an example, the one or more filters 175 may be associated with or otherwise specify a threshold time-to-live of a particular answer. For example, DNS data 155 that has a time-to-live under a threshold amount of time (e.g., less than 3,600 seconds) may be filtered out or otherwise omitted from the DNS data 155.

In another example, the one or more filters 175 may be based on a geographic area in which the recursive DNS server 130 is provided. For example, the observation system 160 and/or the threat intelligence system 150 may identify a geographic location of the client device 110 based on an IP address associated with the query 115 (FIG. 1A). Once the geographic area associated with the client device 110 is determined, the one or more filters 175 may filter out DNS data 155 that is not associated with the determined geographic area. In another example, the observation system 160 may determine which local client devices and/or servers are associated with the geographic area in which the recursive DNS server 130 has been placed and populate the DNS cache 140 based on this information.

In some cases, a single query 115 may have multiple answers 145 and each answer may be associated with a particular geographic area. In such cases, the answers may be filtered based on the geographic area that is to be serviced by the recursive DNS server 130. Thus, the DNS data 155 will only include the answers (and the query) that are associated with the determined geographic area.

The one or more filters 175 may also be based on a popularity of a website associated with a particular query-answer pair. For example, DNS data 155 associated with websites that are visited more frequently when compared to other websites may be provided to the recursive DNS server 130 while the DNS data 155 associated with less frequently visited websites may be filtered out (or provided to the recursive DNS server 130 at a different time).

In yet another example, the DNS cache 140 may receive DNS data 155 that have passed various security protocols instituted by the threat intelligence system 150. For example, as a query 115 is received, the threat intelligence system 150 may analyze the query 115 (or the query-answer pair) to determine whether the query 115 poses a potential security risk. If it is determined the query 115 poses a potential security risk, DNS data 155 associated with that particular query-answer pair will not be provided to the DNS cache 140.

The DNS cache 140 may also receive DNS data 155 from various sources in response to a trigger event. For example, if the recursive DNS server 130 has access to back-up cache or other back-up storage device, the recursive DNS server 130 may request or otherwise receive some DNS data 155 from the back-up cache and receive other DNS data 155 from the threat intelligence system 150. In such an example, the observation system 160 may provide or otherwise apply one or more filters 175 to the DNS data 155 in the back-up cache and to the DNS data 155 provided by the threat intelligence system 150 such as previously described.

In another example, the DNS data 155 may be filtered based on information contained or otherwise associated with a deny list. For example, if a query 115 is received and subsequently denied and/or redirected, an associated answer may include the reasons for the denial and/or redirect information associated with the denial. Accordingly, this information may also be provided to the DNS cache 140 as part of the DNS data 155.

Figure 2:
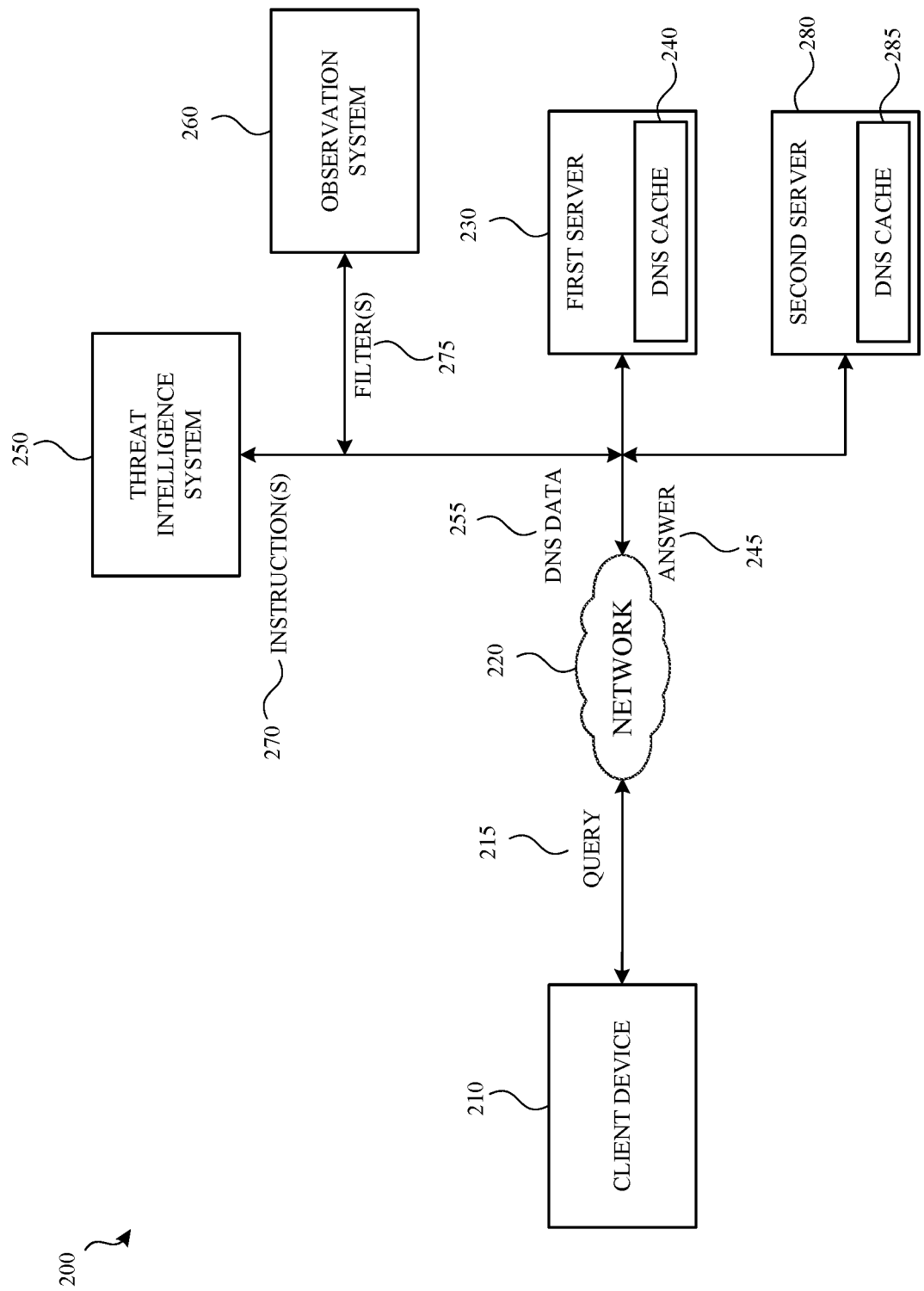
FIG. 2 illustrates an example system in which a threat intelligence system captures DNS data associated with two different recursive DNS servers according to an example.

In another example, the observation system 160 may filter the DNS data based on other recursive DNS servers that are in the same geographic area or near the geographic area of the recursive DNS server 130. For example and turning to FIG. 2, a system 200 may have a first server 230 and a second server 280. Each of the first server 230 and the second server 280 may be recursive DNS servers. As such, the first server 230 may have a DNS cache 240 and the second server 280 may have its own DNS cache 285.

A client device 210 may submit a query 215, via a network 220, to one or more of the first server 230 or the second server 280. A threat intelligence system 250 may passively or actively capture the query 215 and/or the subsequent answer 245. In an example and depending on the query 215, either the first server 230 or the second server 280 receives and responds to the query 215. In such an example, an observation system 260 may analyze the query 215 and/or the answer 245 and also monitor which of the servers respond to the query 215.

When a trigger event is detected (such as previously described) instructions 270 are provided to the threat intelligence system 250. The threat intelligence system 250 may provide DNS data 255 to one or more of the first server 230 or the second server 280 (or to a third server). Additionally, one or more filters 275 may be used to filter the DNS data 255 for one of the servers (e.g., the first server 230) based, at least in part, on the service history of the other server (e.g., the second server 280) and/or based on one or more of the various filters described above.

For example, the observation system 260 may determine that the first server 230 typically services queries 215 for the website www.example.com while the second server 280 typically services queries 215 for the website www.forex-ample.com. If a trigger event associated with the second server 280 is detected by the observation system 260 such that the DNS cache 285 of the second server 280 needed to be populated with DNS data 255, the one or more filters 275 applied by the observation system 260 would account for the above. That is, any DNS data 255 provided by the threat intelligence system 250 to the second server 280 would include query-answer pairs for the website www.forex-ample.com but not for the website www.example.com.

In an example, the observation system 260 may have access to one or more routing tables that list routes to particular network destinations. As such, the one or more filters 275 may be based on the routes provided in the routing table. In another example, the one or more filters 275 may be based on information collected by the observation system 260 as the observation system 260 (or the first server 230 and/or the second server 280) advertise a particular IP address. For example, as the particular IP address is advertised, various routes and service areas associated with the first server 230 and/or the second server 280 may be determined and stored by the observation system 260. Once this information is stored, one or more filters 275 may be generated based on this data and applied when DNS data 255 is provided to the first server 230 and/or the second server 280.

Figure 3:
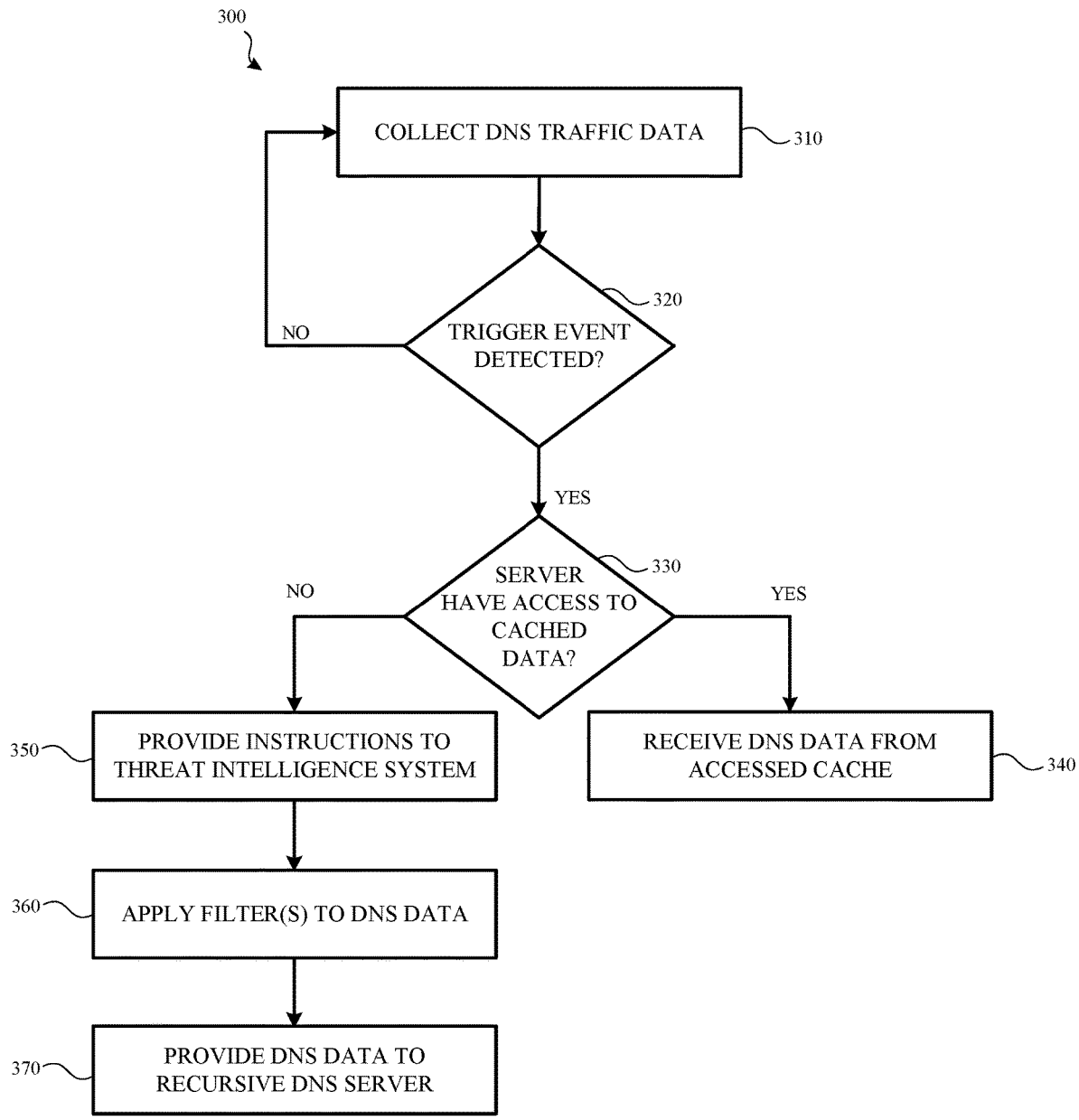
FIG. 3 illustrates a method for populating a DNS cache of a recursive DNS server according to an example.

FIG. 3 illustrates a method 300 for populating a DNS cache of a recursive DNS server using DNS data according to an example. The method 300 may be performed by one or more components and/or systems described above with respect to FIG. 1A-FIG. 2.

Method 300 begins as DNS traffic data is collected (310). In an example, the DNS traffic data may consist of a query, an answer to a query, or a query-answer pair such as previously described. The DNS traffic data may be passively collected or actively collected by a threat intelligence system and/or an observation system associated with one or more recursive DNS servers. In an example, the DNS traffic data may be collected periodically or continuously. The threat intelligence system may collect the DNS traffic data as information (e.g., questions and answers associated with received requests from a client device) is received and/or transmitted by one or more recursive DNS servers.

For example, a recursive DNS server may receive a domain request from a computing device. In response to the request, the recursive DNS server may provide an answer in the form of a record to the computing device. The record may contain information about the initial request, an origin of the request, a destination, an IP address, public key information and so on. As this information is provided to and/or from the recursive DNS server to the computing device, the information is collected, analyzed and/or stored by the threat intelligence system.

As the DNS traffic data is collected, the observation system may monitor (320) the system for a trigger event. The trigger event may be associated with a recursive DNS server or otherwise indicate that a DNS cache of the recursive DNS server needs to be populated with DNS data. For example and as previously described, the trigger event may be an event in which a new recursive server is added to a particular geographic area. In another example, the trigger event is associated with a restart or reboot event of the recursive DNS server.

If a trigger event is not detected, the threat intelligence system may continue to collect (310) DNS traffic data. However, if a trigger event is detected, the observation system may determine (330) whether the recursive DNS server associated with the trigger event has access to cached (or otherwise stored) DNS data.

In an example, the cached DNS data may be stored in a local cache associated with the recursive DNS server. In another example, a neighboring server or other storage device may have access to some, or all, of the DNS data that is to be provided to the DNS cache of the DNS server. In such examples, the recursive DNS server may receive (340) the DNS data from the local cache or other storage device.

However, if it is determined that the server does not have access to any cached data, the observation system may provide (350) one or more instructions to the threat intelligence system. The one or more instructions causes the threat intelligence system to provide DNS data to the recursive DNS server. However, prior to providing the DNS data to the recursive DNS server, one or more filters may be applied (360) to the DNS data. As described above, the filters may be based on a time-to-live of a query-answer pair stored by the threat intelligence system, a geographic area that will be serviced by the recursive DNS server, a popularity or frequency of various requests and the like.

Once the filters have been applied to the DNS data, the DNS data is provided (370) to the DNS cache of the recursive DNS server.

Figure 4:
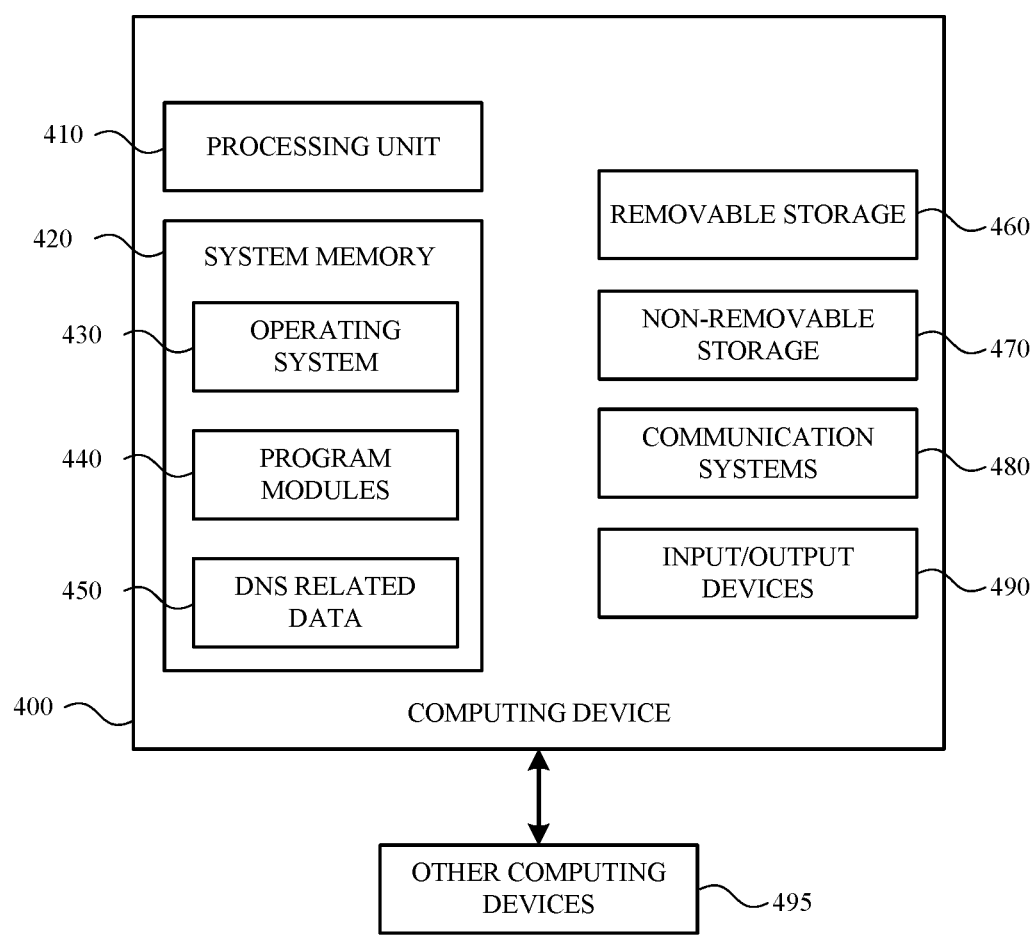
FIG. 4 is a block diagram of a computing device according to one or more examples.

FIG. 4 is a system diagram of a computing device 400 according to an example. The computing device 400, or various components and systems of the computing device 400, may be integrated or associated with a client device, an observation system, a recursive DNS server, or a threat intelligence system. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering DNS relate data 450 such as described above. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   receiving, at a recursive DNS server from an observation system, a trigger notification, the trigger notification indicating a domain name system (DNS) cache of the recursive DNS server is to be populated based on performance metrics and/or events of the recursive DNS server monitored by the observation system;
   requesting, by the recursive DNS server, access to a threat intelligence system, the threat intelligence system storing DNS information contained in query-answer pairs captured from communications between clients and DNS servers;
   receiving, by the recursive DNS server, the DNS information from the threat intelligence system; and
   populating, by the recursive DNS server, the DNS cache of the recursive DNS server with the received DNS information.

2. The method of claim 1, further comprising filtering the query-answer pairs based, at least in part, on a geographic location from which the query-answer pairs originated.

3. The method of claim 1, wherein the query-answer pairs are passively captured by the threat intelligence system.

4. The method of claim 1, further comprising filtering the query-answer pairs based, at least in part, on time-to-live information associated with each of the query-answer pairs.

5. The method of claim 1, further comprising determining a geographic location of the recursive DNS server.

6. The method of claim 5, further comprising filtering the query-answer pairs based, at least in part, on the geographic location of the recursive DNS server.

7. The method of claim 1, further comprising identifying popular queries from the query-answer pair.

8. The method of claim 7, further comprising adding the popular queries to the DNS cache.

9. The method of claim 1, further comprising determining a geographic location of a neighboring DNS server.

10. The method of claim 9, further comprising filtering the query-answer pairs based, at least in part, on the geographic location of the neighboring DNS server.

11. A method, comprising:
    detecting, by a recursive domain name system (DNS) server, a trigger event associated with the recursive DNS server based on performance metrics and/or events of the recursive DNS server;
    in response to detecting the trigger event, determining, by the recursive DNS server, whether the recursive DNS server has access to a cache of DNS information contained in query-answer pairs;
    when it is determined that the recursive DNS server does not have access to the cache of the DNS information contained in the query-answer pairs:
       providing, by a threat intelligence system, the recursive DNS server access to the DNS information contained in the query-answer pairs collected by the threat intelligence system captured from communications between clients and DNS servers; and
       populating, by the recursive DNS server, a DNS cache of the recursive DNS server with the DNS information contained in the query-answer pairs.

12. The method of claim 11, further comprising determining a geographic location of the recursive DNS server.

13. The method of claim 12, further comprising filtering the cache of query-answer pairs based, at least in part, on the geographic location of the recursive DNS server prior to populating the DNS cache of the recursive DNS server with the query-answer pairs.

14. The method of claim 11, wherein the trigger event comprises detecting a reset event associated with the recursive DNS server.

15. The method of claim 11, wherein detecting the trigger event comprises detecting an initialization of the recursive DNS server.

16. The method of claim 11, wherein determining whether the recursive DNS server has access to a cache of query-answer pairs comprises determining whether the recursive DNS server has access to a populated local DNS cache.

17. The method of claim 11, further comprising filtering a query-answer pair based, at least in part, on geographic location associated with a client device that provided a query associated with the query-answer pair.

18. The method of claim 11, further comprising filtering the query-answer pairs based, at least in part, on time-to-live information associated with each of the query-answer pairs.

* * * * *